United States Patent
Lee et al.

(10) Patent No.: US 7,298,592 B2
(45) Date of Patent: Nov. 20, 2007

(54) ACTUATOR WITH DYNAMIC CHARACTERISTIC AND A FOUR SECTION VCM COIL AND DISK DRIVE HAVING THE SAME

(75) Inventors: Haeng-soo Lee, Suwon-si (KR); Seong-woo Kang, Seoul (KR); Young-hoon Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 501 days.

(21) Appl. No.: 10/854,257

(22) Filed: May 27, 2004

(65) Prior Publication Data

US 2005/0111140 A1 May 26, 2005

(30) Foreign Application Priority Data

Nov. 22, 2003 (KR) .................. 10-2003-0083355

(51) Int. Cl.
*G11B 5/54* (2006.01)
(52) U.S. Cl. ..................... 360/265; 360/264.9
(58) Field of Classification Search ............. 360/264.7, 360/264.9, 265
See application file for complete search history.

(56) References Cited

U.S. PATENT DOCUMENTS

| | | | | |
|---|---|---|---|---|
| 4,620,252 A * | 10/1986 | Bauck et al. ................ 360/265 |
| 5,041,935 A * | 8/1991 | Aruga et al. .............. 360/264.9 |
| 5,247,410 A * | 9/1993 | Ebihara et al. ........... 360/264.9 |
| 5,448,437 A * | 9/1995 | Katahara ..................... 360/265 |
| 5,764,441 A * | 6/1998 | Aruga et al. ................ 360/265 |
| 5,768,061 A * | 6/1998 | Casey et al. ................ 360/265 |
| 6,633,457 B1 * | 10/2003 | Lin et al. ................. 360/264.9 |
| 6,816,342 B1 * | 11/2004 | Oveyssi ....................... 360/265 |
| 7,088,566 B2 * | 8/2006 | Martin et al. ................ 361/207 |
| 2004/0228228 A1* | 11/2004 | Yokoyama et al. ...... 369/44.16 |
| 2005/0162782 A1* | 7/2005 | Tsuda et al. ............. 360/264.7 |

FOREIGN PATENT DOCUMENTS

JP     10-3761 A     1/1998
JP     10-106189 A   4/1998

* cited by examiner

Primary Examiner—Jefferson Evans
(74) Attorney, Agent, or Firm—Sughrue Mion, PLLC

(57) ABSTRACT

Provided is an actuator of a disk drive to move a read/write head, for recording and reproducing data, to a predetermined position on a disk. The actuator includes an actuator pivot installed on a base member of the disk drive, a swing arm that is rotatably coupled to the actuator pivot and has a suspension supporting the head at a leading end portion of the swing arm, a coil support portion provided at a rear end portion of the swing arm, a VCM coil coupled to the coil support portion and having four sections having respective particular directions, and magnets arranged to face the VCM coil and having four poles respectively corresponding to the four sections of the VCM coil.

14 Claims, 12 Drawing Sheets

ACTUATOR WITH DYNAMIC CHARACTERISTIC AND A FOUR SECTION VCM COIL AND DISK DRIVE HAVING THE SAME

This application claims the priority of Korean Patent Application No. 2003-83355, filed on Nov. 22, 2003, in the Korean Intellectual Property Office, the disclosure of which is incorporated herein in its entirety by reference.

BACKGROUND OF THE INVENTION

1. Field of the Invention

An apparatus consistent with the present invention relates to a disk drive and, more particularly, to an actuator having an improved dynamic characteristic and a disk drive having the same.

2. Description of the Related Art

Hard disk drives (HDDs), which are data storage devices used for computers, use read/write heads to reproduce data from a disk or record data to a disk. In the HDD, the head performs its functions while being moved by an actuator to a desired position while maintaining a predetermined height from a recording surface of a rotating disk.

The storage capacity of the disk drive has continuously increased. The storage capacity of the disk drive is proportional to a surface recording density. The surface recording density is determined by the multiplication of a linear recording density represented by BPI (bits per inch) and a track density represented by TPI (tracks per inch). The increase of BPI is affected solely by the development of a magnetic recording technology while the increase of TPI is greatly dependent on the improvement of a dynamic characteristic of the actuator.

FIG. 1 is a perspective view illustrating the structure of a conventional disk drive. FIG. 2A is a plan view illustrating the conventional actuator shown in FIG. 1. FIG. 2B is a vertical sectional view taken along line A-A' of FIG. 2A, showing the arrangement of a VCM coil and a magnet of FIG. 1.

Referring to FIGS. 1, 2A, and 2B, the conventional disk drive includes a disk 10 to store data, a spindle motor 20 to rotate the disk 10, and an actuator 30 to move a read/write head 34, which records and reproduces the data, to a desired position on the disk 10. The actuator 30 includes a swing arm 32 that is rotatably coupled to an actuator pivot 31, a suspension 33, which is installed at a leading end portion of the swing arm 32 to support the head 34 to be elastically biased toward a surface of the disk 10, and a voice coil motor (VCM) to rotate the swing arm 32. The voice coil motor includes a VCM coil 37 coupled to a coil support portion 36 provided at a rear end portion of the swing arm 32 and magnets 38 arranged above and under the VCM coil 37 to face the VCM coil 37. Each of the magnets 38, as shown in FIG. 2B, is magnetized to have two polarities, that is, an N pole and an S pole. The magnets 38 are typically supported by being attached to yokes 39.

The voice coil motor having the above structure rotates the swing arm 32 in a direction according to Fleming's left hand rule due to an interaction between a current applied to the VCM coil 37 and a magnetic field formed by the magnets 38. That is, when the disk drive is turned on and the disk 10 starts to rotate at a particular angular velocity Ω, the voice coil motor rotates the swing arm 32 in a predetermined direction, for example, counterclockwise, to move the head 34 above a recording surface of the disk 10. The head 34 is lifted to a predetermined height from a surface of the disk 10 by a lift force generated by the rotating disk 10. In this state, the head 34 follows a particular track 12 of the disk 10 to record or reproduce data with respect to the recording surface of the disk 10.

When the disk drive is turned off and the disk 10 stops rotating, the voice coil motor rotates the swing arm 32 in the opposite direction, for example, clockwise. Accordingly, the head 34 exits out of the recording surface of the disk 10.

In the above disk drive, the operation of actuator 30 is divided into a seeking operation to seek the desired particular track 12 out of a plurality of tracks on the disk 10 and a tracking operation to follow the particular track 12. Such operations are described below in detail.

As shown in FIG. 2A, when current flows through the VCM coil 37 in a particular direction, a force F acts on the VCM coil 37 in a direction following Fleming's left hand rule due to the interaction between the current and the magnetic field generated by the magnets 38. The force F acts on the VCM coil 37 at a right angle. Accordingly, the actuator 30 rotates around the actuator pivot 31 so that the head 34, provided at the leading end portion of the actuator 30, is moved.

As described above, the storage capacity of a disk drive increases gradually and accordingly the number of tracks on the disk 10 increases. When the number of tracks increases, that is, TPI increases, the width of each track decreases. Thus, in order for the head 34 to follow a track having a very narrow width without generating an error signal, that is, a position error signal (PES), the actuator 30, which moves the head 34, needs to be controlled more precisely.

However, the conventional actuator 30 has a variety of resonance modes, in which an in-plane resonance mode is known to exert the greatest effect on the tracking operation of the actuator 30.

FIG. 3 shows the shape of an in-plane resonance mode of the conventional actuator 30 of FIG. 2A. As shown in FIG. 3, the in-plane resonance mode in the conventional actuator 30 has a shape of the swing arm 32 and the coil support portion 36 being twisted at the same phase around the actuator pivot 31. Such in-plane resonance mode is typically referred to as a butterfly mode.

Referring back to FIG. 2A, the force F acting on the VCM coil 37 of the actuator 30 is divided into a component force in a direction X parallel to the direction of the track and a component force in a direction Y perpendicular to the direction of the track. Among them, the component force in the direction Y works as an exiting force to excite the butterfly mode.

FIG. 4 is a graph showing the in-plane response of the head in the tracking operation of the conventional actuator shown in FIG. 2A. Referring to FIG. 4, a peak P having a great magnitude appears at a frequency of about 4800 Hz and the peak P is due to the in-plane resonance mode, that is, the butterfly mode.

As described above, the in-plane resonance mode, that is, the butterfly mode, of the actuator 30 is excited by the component force in the direction Y acting on the VCM coil 37 so that the peak P having a great magnitude is generated. Accordingly, in the tracking operation of the actuator 30, the precise track following of the head 34 becomes difficult as the width of the track is decreased. Thus, the PES increases as the width of the track decreases. Also, as a bandwidth for servo control is restricted by the frequency and magnitude of the peak P, a response to a high frequency becomes defective so that performance of the disk drive is deteriorated.

FIGS. 5A and 5B are views illustrating an actuator having a dual VCM coil to solve the above problem. FIG. 5A shows the flow of current during a seeking operation while FIG. 5B shows the flow of current during a track following operation. The actuator shown in FIGS. 5A and 5B is disclosed in U.S. Pat. No. 6,104,581.

First, referring to FIG. 5A, a dual VCM coil having an outer coil 92 and an inner coil 94 is installed at a rear end portion of an actuator 90. In the actuator 90, when a seeking operation to search for a desired particular track is performed, the direction of current $I_o$ flowing through the outer coil 92 and the direction of current $I_i$ flowing through the inner coil 94 are made identical. Then, since forces $F_o$ and $F_i$ act in the same direction on the outer coil 92 and the inner coil 94, respectively, the actuator 90 performs the seek operation at a fast speed.

Referring to FIG. 5B, when a tracking operation is performed, the direction of the current $I_o$ flowing through the outer coil 92 and the direction of the current $I_i$ flowing through the inner coil 94 are made opposite. Because the direction of the force $F_o$ acting on the outer coil 92 and the direction of the force $F_i$ acting on the inner coil 94 are opposite, the component forces in the direction Y of the two forces $F_o$ and $F_i$ are offset so that the sum of the two component forces in the direction Y acting on the actuator 90 is minimized.

Although the in-plane butterfly mode exists at the actuator 90, the excitation by the component force in the direction Y is minimized when the head follows the track in the above structure. Thus, the height of the peak corresponding to the butterfly mode is lowered so that a dynamic characteristic of the actuator is improved.

However, in the actuator 90 having the above structure, since the two coils 92 and 94 are manufactured and coupled to the rear end portion of the actuator 90, manufacturing the actuator is difficult. Also, since the rear end portion of the actuator 90 becomes heavier due to the two coils 92 and 94, balancing the overall weight of the actuator is difficult. Furthermore, two input power sources, which can independently drive the two coils 92 and 94, are needed. In addition, it is difficult to perform servo control because the directions of the currents flowing through the respective coils 92 and 94 need to be changed by recognizing whether the actuator 90 is in the track following operation or in the seeking operation.

SUMMARY OF THE INVENTION

To solve the above and/or other problems, an apparatus consistent with the present invention provides an actuator which can minimize an exciting force in a direction perpendicular to a track, which excites the in-plane resonance mode of the actuator, to enhance a track following performance, and a disk drive having the same.

According to an aspect of the present invention, an actuator of a disk drive to move a read/write head for recording and reproducing data to a predetermined position on a disk comprises an actuator pivot installed on a base member of the disk drive, a swing arm rotatably coupled to the actuator pivot and having a suspension supporting the head and formed at a leading end portion of the swing arm, a coil support portion provided at a rear end portion of the swing arm, a VCM coil coupled to the coil support portion and having four sections having respective particular directions, and magnets arranged to face the VCM coil and having four poles respectively corresponding to the four sections of the VCM coil.

When a current is applied to the VCM coil, the directions of the current in the four sections of the VCM coil are different from one another.

Assuming that a lengthwise direction of the actuator is a direction X and a widthwise direction of the actuator is a direction Y, the first and second sections of the four sections of the VCM coil are disposed, away from the actuator pivot, on opposite sides with respect to an X direction center line and inclined to be symmetrical with each other with respect to the X direction center line, and the third and fourth sections of the VCM coil are disposed, close to the actuator pivot, on opposite sides with respect to the X direction center line and inclined to be symmetrical with each other with respect to the X direction center line.

The VCM coil has a substantially hexagonal shape and the first, second, third, and fourth sections correspond to the four sides of the hexagonal shape that are not parallel to the direction Y.

Assuming that a lengthwise direction of the actuator is a direction X and a widthwise direction of the actuator is a direction Y, the first and second sections of the four sections of the VCM coil are disposed, away from the actuator pivot, on opposite sides with respect to an X direction center line and inclined to be symmetrical with each other with respect to the X direction center line, and the third and fourth sections of the VCM coil are disposed, close to the actuator pivot, on opposite sides with respect to the X direction center line and parallel to the X direction center line.

The four poles of the magnets are magnetized such that neighboring poles have opposite polarities.

The magnets comprise an upper magnet disposed above the VCM coil and a lower magnet disposed under the VCM coil and four poles of the upper magnet and four poles of the lower magnet are magnetized such that poles facing each other have opposite polarities.

According to another aspect of the present invention, a disk drive includes a disk for storing data, a spindle motor to rotate the disc, and an actuator to move a read/write head, for recording and reproducing data, to a predetermined position on the disk. The actuator comprises an actuator pivot installed on a base member of the disk drive, a swing arm that is rotatably coupled to the actuator pivot and has a suspension supporting the head at a leading end portion of the swing arm, a coil support portion provided at a rear end portion of the swing arm, a VCM coil coupled to the coil support portion and having four sections having respective particular directions, and a magnet arranged to face the VCM coil and having four poles respectively corresponding to the four sections of the VCM coil.

BRIEF DESCRIPTION OF THE DRAWINGS

The above and other features and advantages of the present invention will become more apparent by describing in detail exemplary embodiments thereof with reference to the attached drawings, in which:

FIGS. 5A ad 5B are views illustrating the conventional actuator having a dual VCM coil, in which FIG. 5A shows the flow of current during a seeking operation and FIG. 5B shows the flow of current during a track following operation;

DETAILED DESCRIPTION OF ILLUSTRATIVE, NON-LIMITING EMBODIMENTS OF THE INVENTION

Figure 1:
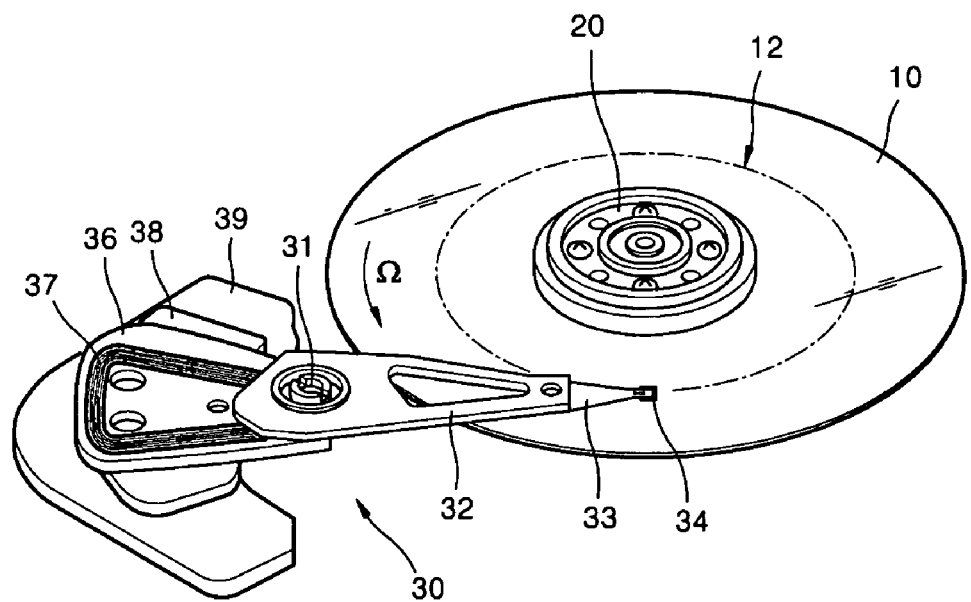
FIG. 1 is a perspective view illustrating the structure of the conventional disk drive.
Figure 2A:
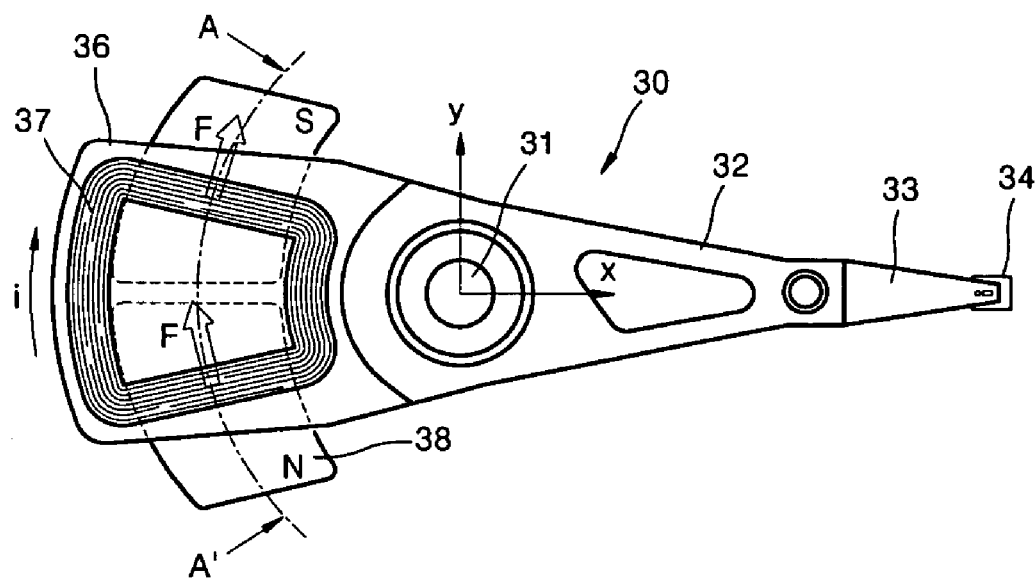
FIG. 2A is a plan view of the actuator of FIG. 1.
Figure 2B:
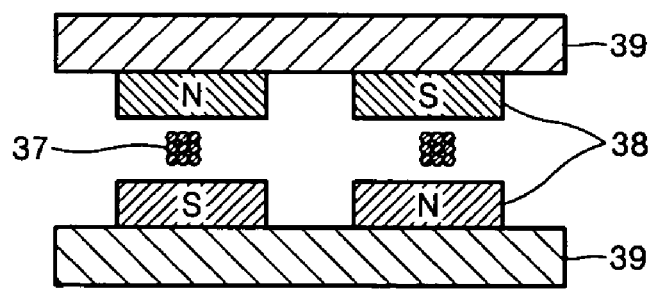
FIG. 2B is a vertical sectional view of the actuator FIG. 2A, taken along line A-A', which illustrates the arrangement of the VCM coil and the magnets of FIG. 1.
Figure 3:
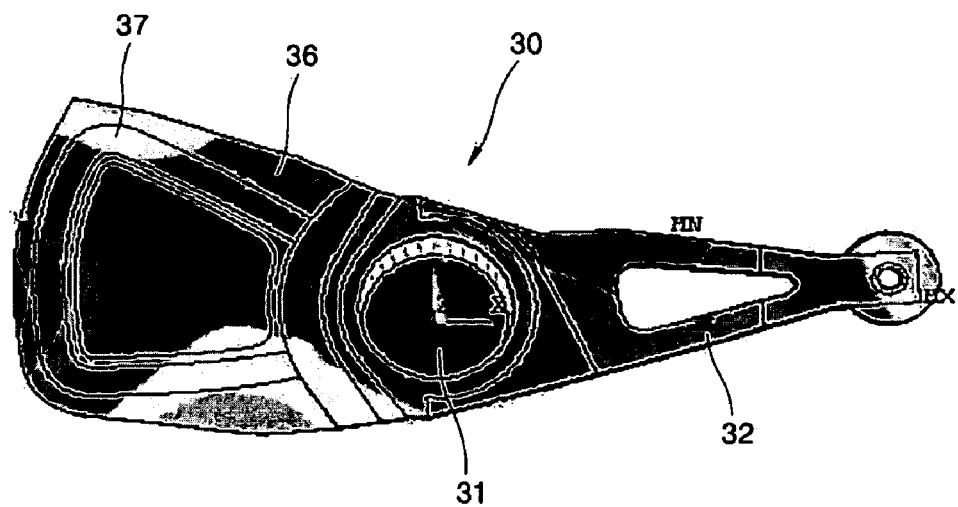
FIG. 3 is a view illustrating the result of simulating the shape of the in-plane resonance mode of the actuator of FIG. 2A.
Figure 4:
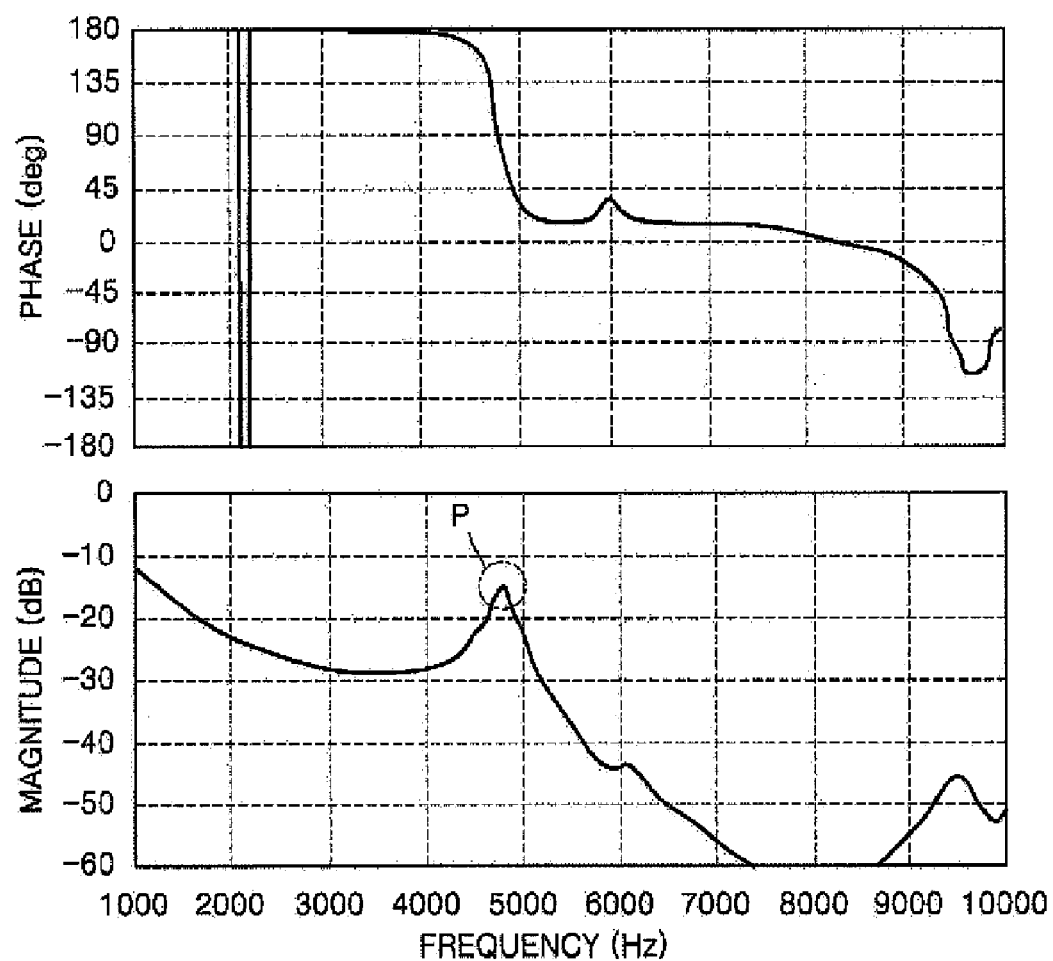
FIG. 4 is a graph showing the in-plane response of the head in the tracking operation of the actuator of FIG. 2A.
Figure 5A:
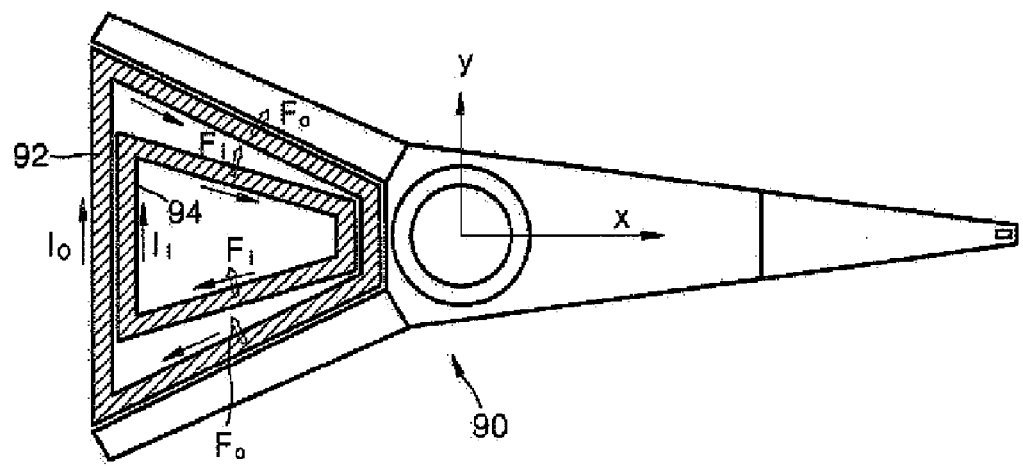
Figure 5B:
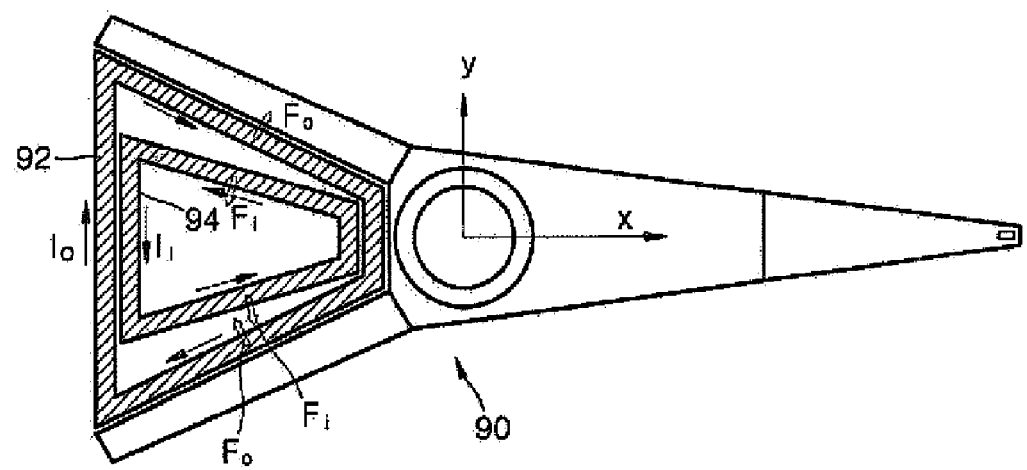

The present invention will be described more fully with reference to the accompanying drawings, in which illustrative, non-limiting embodiments of the invention are shown. In the accompanying drawings, like reference numerals refer to like elements throughout.

Figure 6:
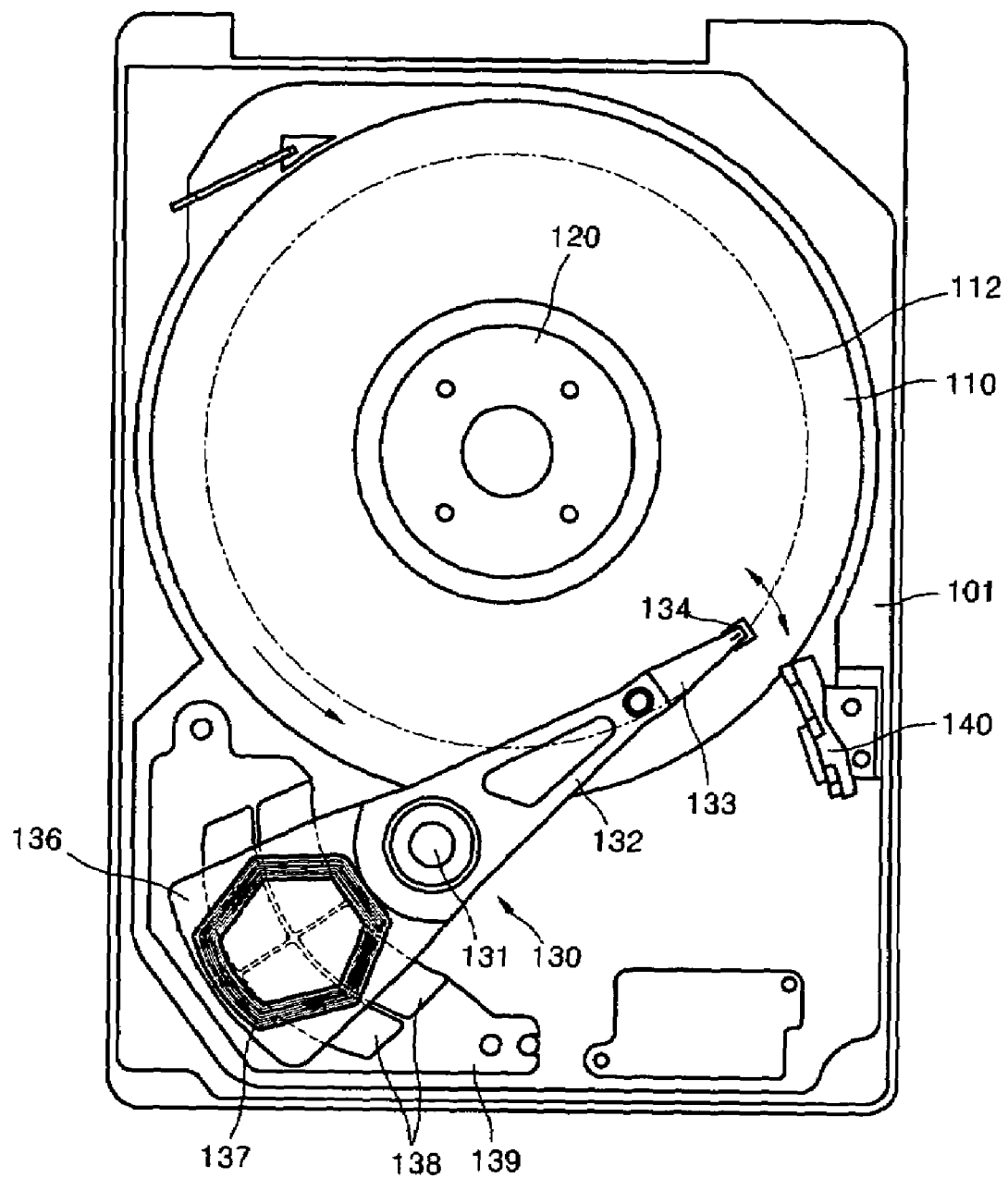
FIG. 6 is a plan view illustrating a disk drive employing an actuator according to a first embodiment of the present invention.

Referring to FIG. 6, a disk drive according to a first embodiment of the present invention includes a spindle motor 120 to rotate a disk 110 which stores data and an actuator 130 to move a read/write head 134, which records and reproduces data, to a predetermined position above the disk 110.

The spindle motor 120 is installed on a base member 101 of the disk drive. One or more discs 110 are installed on the spindle motor 120 and the disk 110 is rotated by the spindle motor 120 at a predetermined angular velocity.

The actuator 130 includes an actuator pivot 131 installed on the base member 101, a swing arm 132, a suspension 133, a read/write head 134, a coil support portion 136, and a voice coil motor. The swing arm 132 is rotatably coupled to the actuator pivot 131. The suspension 133 is coupled to a leading end portion of the swing arm 132 and supports the head 134 to be elastically biased toward a surface of the disk 110. The coil support portion 136 is provided at a rear end portion of the swing arm 132.

The voice coil motor provides a driving force to rotate the swing arm 132 in a direction according to Fleming's left hand rule due to an interaction between a current applied to the VCM coil 137 and a magnetic field formed by magnets 138. The VCM coil 137 is coupled to the coil support portion 136. The magnets 138 are disposed above and under the VCM coil 137 to face the VCM coil 137 and are supported through an attachment to a yoke 139. The VCM coil 137 and the magnets 138 are described later.

When the disk drive is turned on and the disk 110 starts to rotate, the voice coil motor rotates the swing arm 132 in a predetermined direction, for example, counterclockwise, and loads the head 134 on a recording surface of the disk 110. The head 134 is lifted to a predetermined height from the surface of the disk 110 by a lifting force generated by the rotating disk 110. In this state, while following a particular track 112 of the disk 110, the head 134 records data to or reproduces data from the recoding surface of the disk 110.

When the disk drive is turned off, the disk 110 stops rotation and the voice coil motor rotates the swing arm 132 in the opposite direction, for example, clockwise, so that the head 134 exits from the recording surface of the disk 110. When the head 134 is out of the recording surface of the disk 110, it is parked on a ramp 140 provided outside the disk 110.

The operation of the actuator 130 includes a seeking operation to search for the desired particular track 112 of a number of tracks on the disk 110 and a tracking operation to follow the particular track 112.

Figure 7:
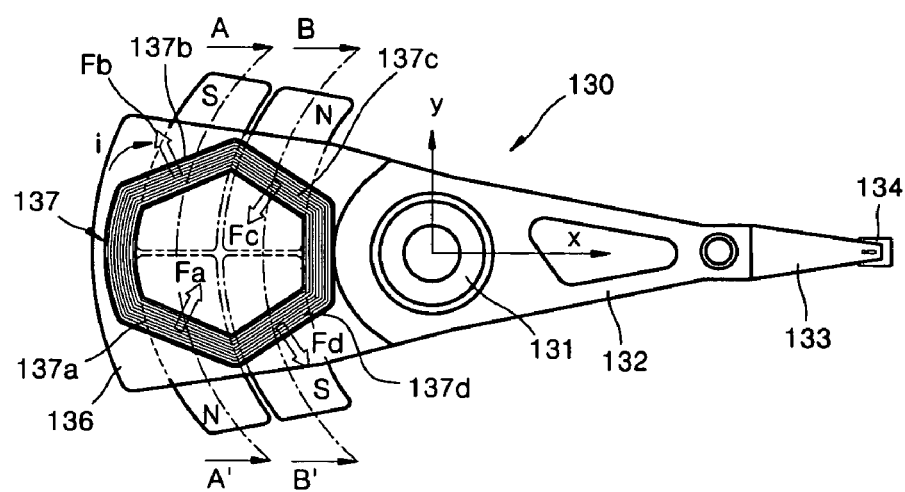
FIG. 7 is a plan view of the actuator of FIG. 6.
Figure 8A:
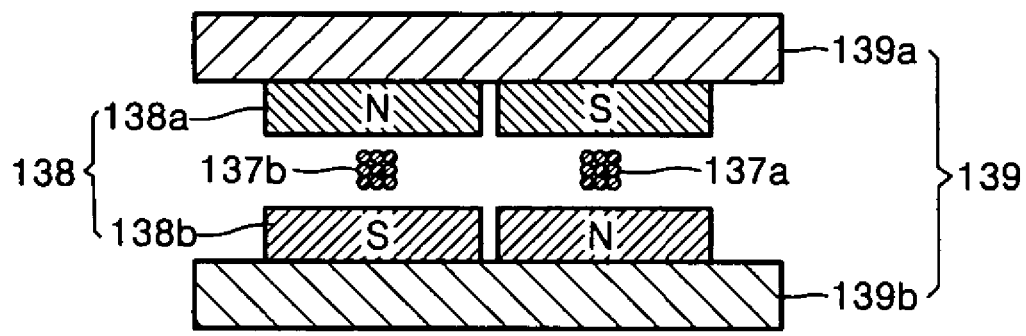
FIGS. 8A and 8B are vertical sectional views of the actuator of FIG. 7, taken along lines A-A' and B-B', respectively, which show the arrangement of a VCM coil and magnets.
Figure 8B:
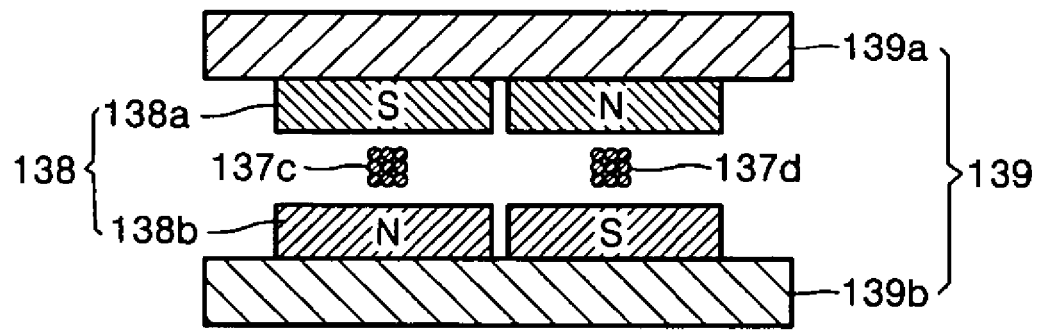

FIG. 7 is a plan view of the actuator of FIG. 6. FIGS. 8A and 8B are vertical sectional views of the actuator of FIG. 7, taken along lines A-A' and B-B', respectively, which show the arrangement of the VCM coil and the magnets. In these drawings, a direction X indicates a lengthwise direction of the actuator, that is, a direction parallel to the track direction while a direction Y indicates a widthwise direction of the actuator, that is, a direction perpendicular to the track direction.

Referring to FIGS. 7, 8A, and 8B together, in the actuator 130 according to a first embodiment of the present invention, the VCM coil 137 includes four sections 137a, 137b, 137c, and 137d which are arranged in the respective directions. The first and second sections 137a and 137b of the VCM coil 137 are disposed away from the actuator pivot 131 while the third and fourth sections 137c and 137d are disposed close to the actuator pivot 131.

The first and second sections 137a and 137b are disposed on opposite sides with respect to an X axis passing through the center of the actuator pivot 131, that is, an X direction center line, and have symmetrically inclined directions with respect to the X direction center line. Also, the third and fourth sections 137c and 137d are disposed on opposite sides with respect to the X direction center line and have symmetrically inclined directions with respect to the X direction center line. The inclination directions of the first and fourth sections 137a and 137d, which are disposed on one side with respect to the X direction center line, are opposite to one another. Also, the inclination directions of the second and third sections 137b and 137c, which are disposed on the other side with respect to the X direction center line, are opposite to one another.

The VCM coil 137, as shown in FIG. 7, may have a substantially hexagonal shape on a plane. That is, the first, second, third, and fourth sections 137a, 137b, 137c, and 137d of the VCM coil 137 correspond to the four sides of the hexagonal shape that are not parallel to the rotational direction of the actuator 130, that is, the Y direction. Thus, the direction of the current flowing through the VCM coil 137 changes in each of the first, second, third, and fourth sections 137a, 137b, 137c, and 137d.

The magnets 138 include an upper magnet 138a disposed above the VCM coil 137 and a lower magnet 138b disposed under the VCM coil 137. The upper and lower magnets 138a and 138b are supported by being attached to upper and lower yokes 139a and 139b, respectively. The upper magnets 138a are divided to have four poles corresponding to the first, second, third, and fourth sections 137a, 137b, 137c, and 137d. The four poles are magnetized such that neighboring poles have the opposite polarities. The lower magnets 138b are divided to have four poles corresponding to the first, second, third, and fourth sections 137a, 137b, 137c, and 137d. The four poles are magnetized such that neighboring poles have the opposite polarities. Also, the four poles of the upper magnet 138a and the four poles of the lower magnet 138b are magnetized such that poles facing each other have the opposite polarities.

In the actuator 130 according to the first embodiment of the present invention, when a current is applied to the VCM coil 137, forces Fa, Fb, Fc, and Fd act on the first, second, third, and fourth sections 137a, 137b, 137c, and 137d of the VCM coil 237, respectively, in directions according to Fleming's left hand rule due to an interaction between the directions of current at the first, second, third, and fourth sections 137a, 137b, 137c, and 137d of the VCM coil 137 and a magnetic field generated by the magnets 138. Since the forces Fa, Fb, Fc, and Fd act perpendicularly on the respective first, second, third, and fourth sections 137a, 137b, 137c, and 137d, the directions thereof are different from one another.

Figure 9:
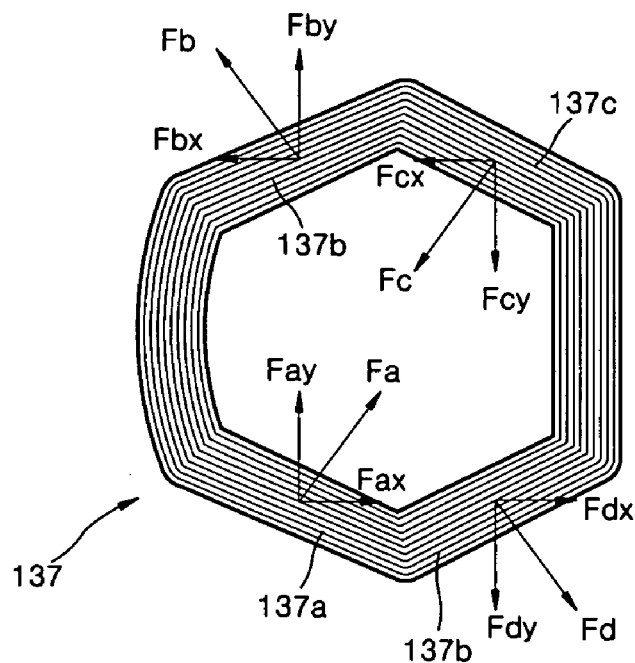
FIG. 9 is a view illustrating component forces in directions X and Y acting on the respective sections of the VCM coil of the actuator of FIG. 6.
Figure 10:
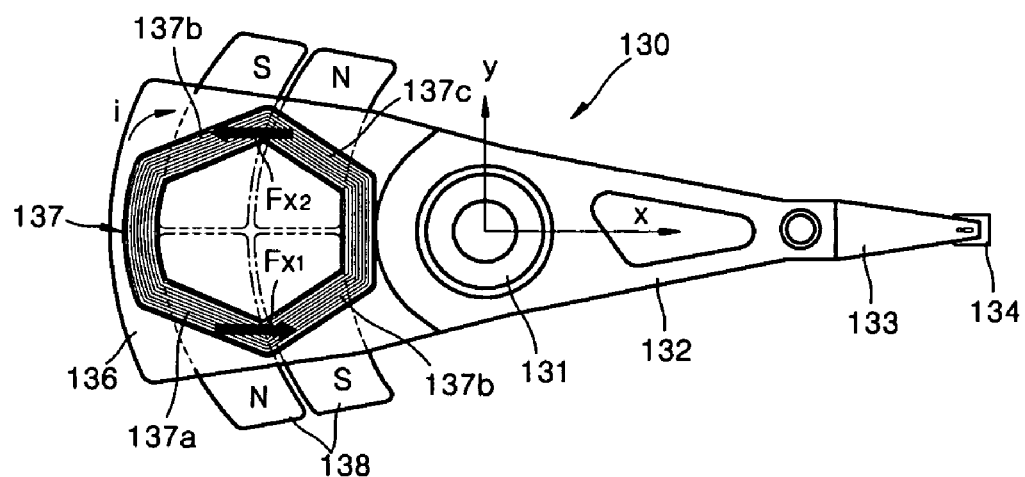
FIG. 10 is a view illustrating a resultant force acting on the VCM coil of the actuator of FIG. 6.

FIG. 9 is a view illustrating component forces in directions X and Y acting on the respective sections of the VCM coil of the actuator of FIG. 6. FIG. 10 is a view illustrating a resultant force acting on the VCM coil of the actuator of FIG. 6.

First, referring to FIG. 9, the four forces Fa, Fb, Fc, and Fd acting on the respective first, second, third, and fourth sections 137a, 137b, 137c, and 137d of the VCM coil 137 can be divided into X directional component forces Fax, Fbx, Fcx, and Fdx and Y directional component forces Fay, Fby, Fcy, and Fdy. The Y directional component forces Fay, Fby, Fcy, and Fdy acting on the entire VCM coil 137 are offset by one another. The first and second Y directional component forces Fay and Fby acting on the first and second sections 137a and 137b disposed away from the actuator pivot 131 and the third and fourth Y directional component forces Fcy and Fdy acting on the third and fourth sections 137c and 137d disposed close to the actuator pivot 131 have the opposite directions so that the forces can offset one another.

Thus, by adjusting the length and/or direction of the first, second, third, and fourth sections 137a, 137b, 137c, and 137d of the VCM coil 137, the resultant force of the first, second, third, and fourth Y directional component forces Fay, Fby, Fcy, and Fdy can be zero or minimized.

The Y directional component forces Fay, Fby, Fcy, and Fdy applied to the VCM coil 137 act as a major exciting force to excite the in-plane resonance mode, that is, a butterfly mode, of the actuator 130. Thus, when the resultant force of the Y directional component forces Fay, Fby, Fcy, and Fdy becomes zero, the major exciting force to excite the in-plane resonance mode of the actuator 130 preferably disappears. However, to drive the actuator 130 at a faster speed, the Y directional component forces Fay, Fby, Fcy, and Fdy may be minimized instead of making them zero so that the Y directional component forces Fay, Fby, Fcy, and Fdy remain to a certain degree.

As described above, although the in-plane butterfly mode exists in the actuator 130 according to the present invention, because the excitation by the Y directional component forces Fay, Fby, Fcy, and Fdy is minimized during the tacking operation of the actuator 130, the dynamic characteristic of the actuator 130 can be improved. That is, as the height of a peak corresponding to the butterfly mode which most affects the tracking operation of the actuator 130 decreases, precision and performance are improved during the track following operation of the head 134, which will be described later.

As described above, the Y directional component forces Fay, Fby, Fcy, and Fdy of the force respectively acting on the first, second, third, and fourth sections 137a, 137b, 137c, and 137d of the VCM coil 137 are offset with one another so as to be zero or minimized. In contrast, the X directional component forces Fax, Fbx, Fcx, and Fdx of the force respectively acting on the first, second, third, and fourth sections 137a, 137b, 137c, and 137d of the VCM coil 137 are not offset and work as a driving force to drive the actuator 130.

The first and fourth X directional component forces Fax and Fdx acting on the first and fourth sections 137a and 137d of the VCM coil 137 are disposed on one side with respect to the X direction center line. The second and third X directional component forces Fbx and Fcx acting on the second and third sections 137b and 137c of the VCM coil 137 are disposed on the other side with respect to the X direction center line. The first and fourth X directional component forces Fax and Fdx and the second and third X directional component forces Fbx and Fcx act in different directions from each other.

Thus, as shown in FIG. 10, the X directional resultant force $Fx_1$ acting on the first and fourth sections 137a and 137d of the VCM coil 137 and the X directional resultant force $Fx_2$ acting on the second and third sections 137b and 137c act in different directions and are on opposite sides with respect to the X directional center line so that a torque to rotate the actuator 130 around the actuator pivot 131 is generated. Accordingly, since the actuator 130 can rotate around the actuator pivot 131, the seeking operation and the tracking operation of the actuator 130 can be performed. When the Y directional component forces Fay, Fby, Fcy, and Fdy remain to a certain degree, the torque rotating the actuator 130 increases and the actuator 130 can be driven at a faster speed.

Figure 11:
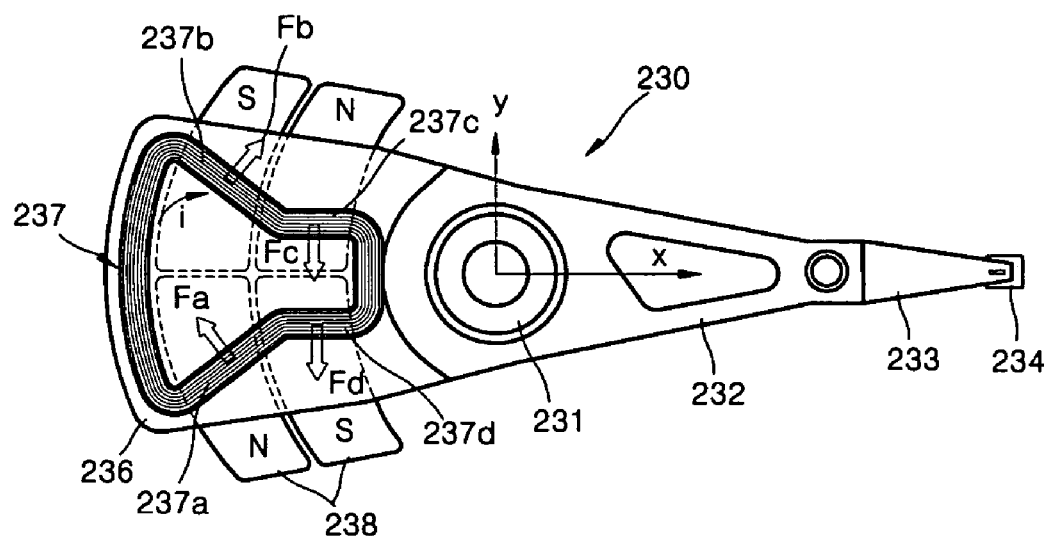
FIG. 11 is a plan view illustrating an actuator according to a second embodiment of the present invention.

FIG. 11 is a plan view of an actuator according to a second embodiment of the present invention. Referring to FIG. 11, an actuator 230 according to the second embodiment of the present invention includes an actuator pivot 231, a swing arm 232, a suspension 233, a read/write head 234, and a coil support portion 236. The descriptions of these constituent elements are omitted herein since they are the same as those in the above-described first embodiment.

The actuator 230 includes a voice coil motor which provides a driving force to rotate the swing arm 232. The voice coil motor includes a VCM coil 237 coupled to the coil support portion 236 and magnets 238 arranged above and under the VCM coil 237 to face the VCM coil 237. The structures of the VCM coil 237 and the magnets 238 are the same as those in the first embodiment, except for the shape of the VCM coil 237.

In the present embodiment, the VCM coil 237 includes four sections 237a, 237b, 237c, and 237d respectively arranged in particular directions. The first and second sections 237a and 237b of the VCM coil 237 are disposed away from the actuator pivot 231 and the third and fourth sections 237c and 237d are disposed close to the actuator pivot 231. The first and second sections 237a and 237b are disposed on opposite sides with respect to the X direction center line and are inclined to be symmetrical with each other with respect to the X direction center line. The third and fourth sections 237c and 237d are disposed on opposite sides with respect to the X direction center line and are parallel to the X direction center line. Thus, current flowing through the VCM coil having the above structure flows in different directions at each of the first, second, third, and fourth sections 237a, 237b, 237c, and 237d.

Since the magnets 238 have the same structure of the magnets 138 in the above-described first embodiment, a detailed description thereon is omitted herein. The vertical sectional structures of the VCM coil 237 and the magnets 238 are the same as those shown in FIGS. 8A and 8B.

In the actuator 230 according to the second embodiment of the present invention having the above structure, when a current is applied to the VCM coil 237, the forces Fa, Fb, Fc, and Fd act on the first, second, third, and fourth sections 237a, 237b, 237c, and 237d of the VCM coil 237, respectively, in a direction following Fleming's left hand rule due to an interaction between the direction of the current flowing through each of the first, second, third, and fourth sections 237a, 237b, 237c, and 237d of the VCM coil 237 and a magnetic field formed by the magnets 238. The forces Fa, Fb, Fc, and Fd act in directions perpendicular to the respective first, second, third, and fourth sections 237a, 237b, 237c, and 237d of the VCM coil 237.

Figure 12:
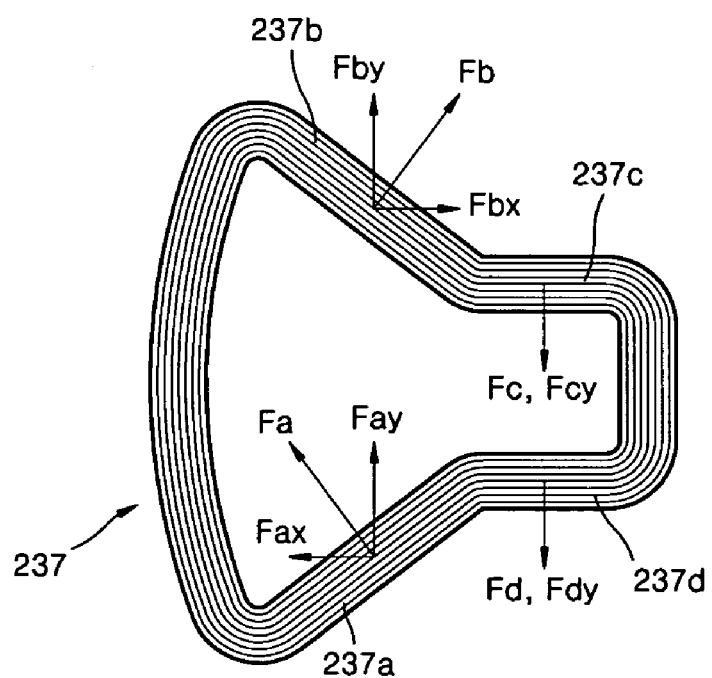
FIG. 12 is a view illustrating component forces in directions X and Y acting on the VCM coil of the actuator of FIG. 11.
Figure 13:
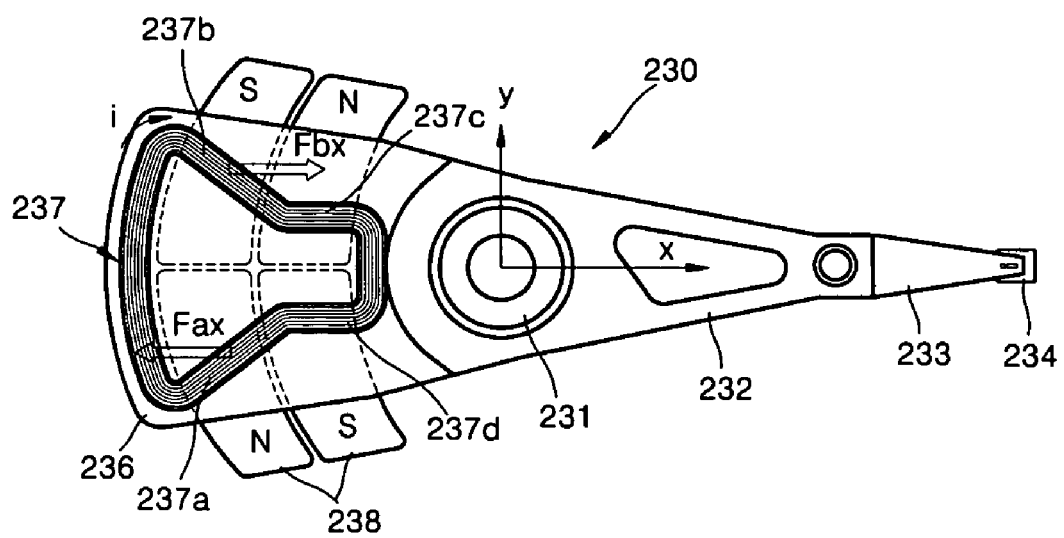
FIG. 13 is a view illustrating a resultant force acting on the VCM coil of the actuator of FIG. 11.

FIG. 12 is a view illustrating component forces in directions X and Y of the force acting on the respective sections of the VCM coil of the actuator according to the second embodiment of the present invention. FIG. 13 is a view illustrating a resultant force acting on the VCM coil of the actuator according to the second embodiment of the present invention.

First, referring to FIG. 12, the two forces Fa and Fb acting on the first and second sections 237a and 237b of the VCM coil 237, respectively, can be divided into the X directional component forces Fax and Fbx and the Y directional component forces Fay and Fby. Since the third and fourth sections 237c and 237d of the VCM coil 237 are parallel to the direction X, the two forces Fc and Fd respectively acting on the third and fourth sections 237c and 237d act in the direction Y so that only the Y directional component forces Fcy and Fdy remain. Since the first and second Y directional component forces Fay and Fby respectively acting on the first and second sections 237a and 237b disposed away from the actuator pivot 231 and the third and fourth Y directional component forces Fcy and Fdy respectively acting on the third and fourth sections 237c and 237d disposed close to the actuator pivot 231 have the opposite directions, they can be offset.

Thus, in the present embodiment, the resultant force of the first, second, third, and fourth Y directional component forces Fay, Fby, Fcy, and Fdy can be zero or minimized by adjusting the length and/or direction of each of the first, second, third, and fourth sections 237a, 237b, 237c, and 237d of the VCM coil 237. The effect according to the present embodiment is the same as that of the first embodiment.

In the second embodiment of the present invention, only the X direction component forces Fax and Fbx act on the first and second sections 237a and 237b of the VCM coil 237, they are not offset and act as a driving force to drive the actuator 230.

As shown in FIG. 13, the first and second X directional component forces Fax and Fbx acting on the first and second sections 237a and 237b, respectively, are disposed on opposite sides with respect to the X direction center line and have different directions. As a result, a torque to rotate the actuator 230 around the actuator pivot 231 by the first and second X directional component forces Fax and Fbx can be generated. Accordingly, since the actuator 230 can rotate around the actuator pivot 231, the seeking operation and the tracking operation of the actuator 230 can be performed.

Figure 14:
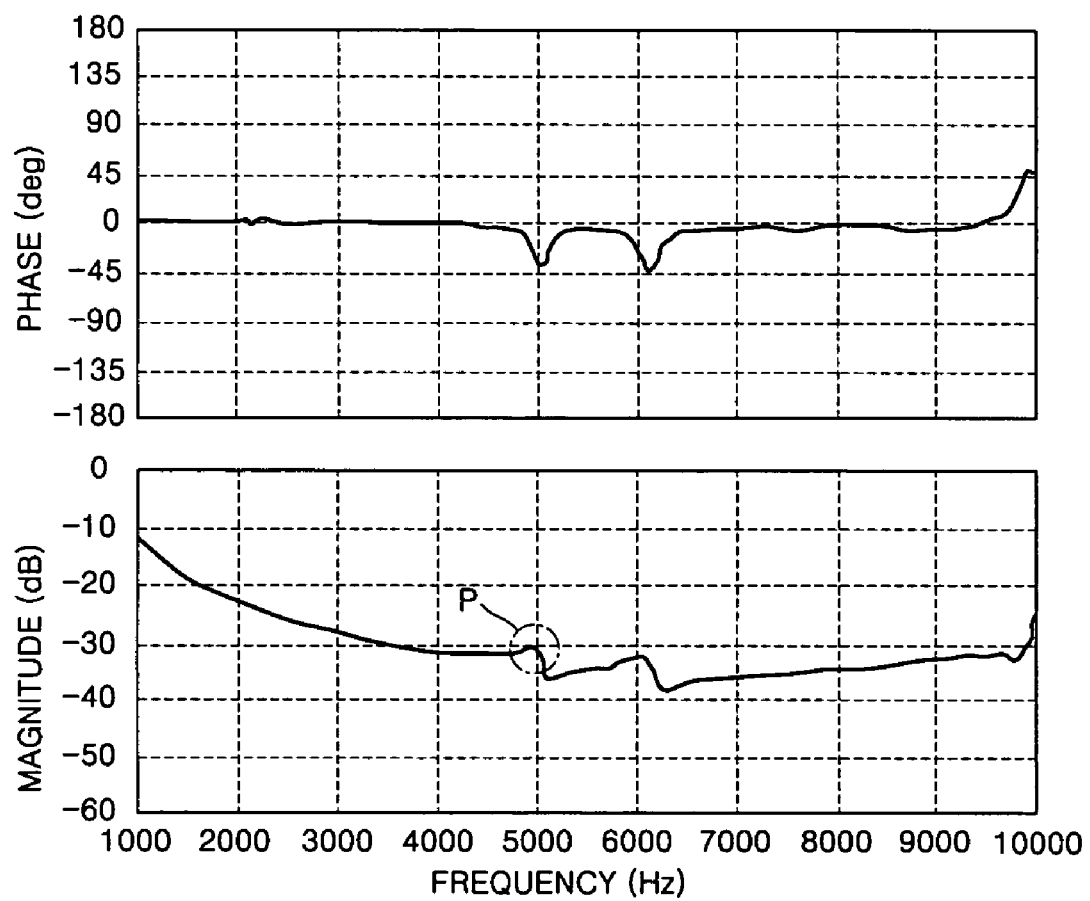
FIG. 14 is a graph showing the in-plane response of the head in the tracking operation of the actuator of FIG. 7.

FIG. 14 is a graph showing the in-plane response of the head in the tracking operation of the actuator according to the first embodiment of the present invention shown in FIG. 7. Referring to a graph of FIG. 14, in the actuator according to the present invention, the peak P corresponding to an in-plane resonance mode, that is, a butterfly mode, appears at a frequency of about 5000 Hz and the magnitude of the peak P is decreased considerably when compared to the conventional technology. This is because, in the actuator according to the present invention, an exciting force exciting the butterfly mode, that is, the resultant force of the Y directional component forces acting on the VCM coil, is minimized or becomes zero. When the magnitude of the peak P corresponding to the butterfly mode decreases, a very accurate tracking operation of the actuator is possible, thus, PES is decreased. Also, since the magnitude of the peak P decreases when compared to the conventional technology, a band width for servo control can be increased so that the performance of a disk drive can be improved.

Table 1 below shows the comparison of the servo band width and PES between an actuator consistent with the present invention and the conventional actuator.

TABLE 1

| | | Conventional actuator | Actuator according to the present invention | Variation rate |
|---|---|---|---|---|
| Servo band width | | 1120 Hz | 1400 Hz | 25% |
| PES | RRO | 14.5 | 9.8 | −32.4% |
| | NRRO | 14.6 | 9.9 | −32.2% |
| | TOTAL | 20.6 | 13.9 | −32.5% |

In Table 1, RRO (repeatable run-out) refers to a repeated vibration and NRRO (non repeatable run-out) refers to a non-repeated vibration.

Referring to Table 1, the servo band width of the actuator according to the present invention is increased by about 25% when compared to the conventional actuator. PES by an overall vibration including the repeated vibration and the non-repeated vibration in the actuator according to the present invention is decreased by about 32.5% when compared to that of the conventional actuator.

As described above, according to the present invention, the exciting force in a direction perpendicular to the track which excites the in-plane resonance mode of the actuator can be minimized or becomes zero. Thus, the magnitude of a peak corresponding to the in-plane resonance mode decreases so that accuracy and performance in the track following operation of the head are improved. Also, since the servo band width needed for servo control can be increased when compared to the conventional technology, PES is decreased so that performance of a disk drive is improved.

Furthermore, since the number of tracks can be increased based on the improved dynamic characteristic of the actuator, a disk drive having a large storing capacity can be realized. In addition, since only a single coil is used, difficulties in manufacturing and servo control due to an increase in the number of coils can be prevented.

While this invention has been particularly shown and described with reference to exemplary embodiments thereof, it will be understood by those of ordinary skill in the art that various changes in form and details may be made therein without departing from the spirit and scope of the invention as defined by the appended claims. For example, although the VCM coil of the actuator according to the present invention is described to have the shape shown in FIG. 7 or 11, the VCM coil is not limited thereto and may have a variety of shapes within a range of the technical concept of the present invention.

What is claimed is:

1. An actuator of a disk drive to move a read/write head, for recording and reproducing data, to a predetermined position on a disk, the actuator comprising:

an actuator pivot installed on a base member of the disk drive;

a swing arm rotatably coupled to the actuator pivot and having a suspension supporting the head and formed at a leading end portion of the swing arm;

a coil support portion provided at a rear end portion of the swing arm;

a VCM coil coupled to the coil support portion and having four sections having respective particular directions; and magnets arranged to face the VCM coil and having four poles respectively corresponding to the four sections of the VCM coil, wherein, when current is applied to the VCM coil, directions of the current in the four sections of the VCM coil are different from one another, and wherein, assuming that a lengthwise direction of the actuator is a direction X and a widthwise direction of the actuator is a direction Y, first and second sections of the four sections of the VCM coil are disposed, away from the actuator pivot, on opposite sides with respect to an X direction center line and inclined to be symmetrical with each other with respect to the X direction center line, and third and fourth sections of the VCM coil are disposed, close to the actuator pivot, on opposite sides with respect to the X direction center line and inclined to be symmetrical with each other with respect to the X direction center line.

2. The actuator as claimed in claim 1, wherein the VCM coil has a substantially hexagonal shape and the first, second, third, and fourth sections correspond to four sides of the hexagonal shape, except for two sides parallel to the direction Y.

3. The actuator as claimed in claim 1, wherein the directions of forces acting on the first, second, third, and fourth sections are different from one another.

4. The actuator as claimed in claim 1, wherein the four poles of the magnets are magnetized such that neighboring poles have opposite polarities.

5. The actuator as claimed in claim 1, wherein the magnets comprise an upper magnet disposed above the VCM coil and a lower magnet disposed under the VCM coil and four poles of the upper magnet and four poles of the lower magnet are magnetized such that poles facing each other have opposite polarities.

6. An actuator of a disk drive to move a read/write head, for recording and reproducing data, to a predetermined position on a disk, the actuator comprising:

an actuator pivot installed on a base member of the disk drive;

a swing arm rotatably coupled to the actuator pivot and having a suspension supporting the head and formed at a leading end portion of the swing arm;

a coil support portion provided at a rear end portion of the swing arm;

a VCM coil coupled to the coil support portion and having four sections having respective particular directions; and magnets arranged to face the VCM coil and having four poles respectively corresponding to the four sections of the VCM coil, wherein, when current is applied to the VCM coil, directions of the current in the four sections of the VCM coil are different from one another, and wherein, assuming that a lengthwise direction of the actuator is a direction X and a widthwise direction of the actuator is a direction Y, first and second sections of the four sections of the VCM coil are disposed, away from the actuator pivot, on opposite sides with respect to an X direction center line and inclined to be symmetrical with each other with respect to the X direction center line, and third and fourth sections of the VCM coil are disposed, close to the actuator pivot, on opposite sides with respect to the X direction center line and parallel to the X direction center line.

7. The actuator as claimed in claim 6, wherein the directions of forces acting on the first and second sections are different from each other while the directions of forces acting on the third and fourth sections are substantially identical.

8. A disk drive including a disk for storing data, a spindle motor to rotate the disk, and an actuator to move a read/write head, for recording and reproducing data, to a predetermined position on the disk, the actuator comprising:

an actuator pivot installed on a base member of the disk drive;

a swing arm rotatably coupled to the actuator pivot and having a suspension supporting the head and formed at a leading end portion of the swing arm;

a coil support portion provided at a rear end portion of the swing arm;

a VCM coil coupled to the coil support portion and having four sections having respective particular directions; and a magnet arranged to face the VCM coil and having four poles respectively corresponding to the four sections of the VCM coil, wherein, when current is applied to the VCM coil, directions of the current in the four sections of the VCM coil are different from one another, wherein, assuming that a lengthwise direction of the actuator is a direction X and a widthwise direction of the actuator is a direction Y, first and second sections of the four sections of the VCM coil are disposed, away from the actuator pivot, on opposite sides with respect to an X direction center line and inclined to be symmetrical with each other with respect to the X direction center line, and third and fourth sections of the VCM coil are disposed, close to the actuator pivot, on opposite sides with respect to the X direction center line and inclined to be symmetrical with each other with respect to the X direction center line.

9. The disk drive as claimed in claim 8, wherein the VCM coil has a substantially hexagonal shape and the first, second, third, and fourth sections correspond to four sides of the hexagonal shape, except for two sides parallel to the direction Y.

10. The disk drive as claimed in claim 8, wherein the directions of forces acting on the first, second, third, and fourth sections are different from one another.

11. The disk drive as claimed in claim 8, wherein the four poles of the magnets are magnetized such that neighboring poles have opposite polarities.

12. The disk drive as claimed in claim 8, wherein the magnets comprise an upper magnet disposed above the VCM coil and a lower magnet disposed under the VCM coil and four poles of the upper magnet and four poles of the lower magnet are magnetized such that poles facing each other have opposite polarities.

13. A disk drive including a disk for storing data, a spindle motor to rotate the disk, and an actuator to move a read/write head, for recording and reproducing data, to a predetermined position on the disk, the actuator comprising:
- an actuator pivot installed on a base member of the disk drive;
- a swing arm rotatably coupled to the actuator pivot and having a suspension supporting the head and formed at a leading end portion of the swing arm;
- a coil support portion provided at a rear end portion of the swing arm;
- a VCM coil coupled to the coil support portion and having four sections having respective particular directions; and
- a magnet arranged to face the VCM coil and having four poles respectively corresponding to the four sections of the VCM coil, wherein, when current is applied to the VCM coil, directions of the current in the four sections of the VCM coil are different from one another, and wherein, assuming that a lengthwise direction of the actuator is a direction X and a widthwise direction of the actuator is a direction Y, first and second sections of the four sections of the VCM coil are disposed, away from the actuator pivot, on opposite sides with respect to an X direction center line and inclined to be symmetrical with each other with respect to the X direction center line, and third and fourth sections of the VCM coil are disposed, close to the actuator pivot, on opposite sides with respect to the X direction center line and parallel to the X direction center line.

14. The disk drive as claimed in claim 13, wherein the directions of forces acting on the first and second sections are different from each other while the directions of forces acting on the third and fourth sections are substantially identical.

* * * * *